United States Patent
Lee et al.

(10) Patent No.: US 10,540,547 B2
(45) Date of Patent: Jan. 21, 2020

(54) APPARATUS AND METHOD FOR DETECTING DEBATABLE DOCUMENT

(71) Applicant: NCSOFT Corporation, Seoul (KR)

(72) Inventors: Yeon Soo Lee, Seongnam-si (KR); Jun Yeop Lee, Seongnam-si (KR); Jung Sun Jang, Seongnam-si (KR); Sang Min Heo, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 84 days.

(21) Appl. No.: 15/851,624

(22) Filed: Dec. 21, 2017

(65) Prior Publication Data

US 2018/0189559 A1    Jul. 5, 2018

(30) Foreign Application Priority Data

Dec. 29, 2016  (KR) .................. 10-2016-0182612

(51) Int. Cl.
| | |
|---|---|
| *G06K 9/00* | (2006.01) |
| *G06K 9/66* | (2006.01) |
| *G06K 9/46* | (2006.01) |
| *G06K 9/62* | (2006.01) |

(52) U.S. Cl.
CPC ....... *G06K 9/00442* (2013.01); *G06K 9/4604* (2013.01); *G06K 9/6274* (2013.01); *G06K 9/66* (2013.01)

(58) Field of Classification Search
CPC ............. G06K 9/00442; G06K 9/4604; G06K 9/6274; G06K 9/66; G06K 9/6256; G06F 17/2785; G06F 17/277; G06F 17/3344; G06F 17/3347; G06N 20/00; G06N 3/02
USPC ....................................................... 382/157
See application file for complete search history.

(56) References Cited

U.S. PATENT DOCUMENTS

| | | | |
|---|---|---|---|
| 2016/0350288 A1* | 12/2016 | Wick ................... | G06F 17/2735 |
| 2017/0308790 A1* | 10/2017 | Nogueira dos Santos ................ | G06N 3/084 |
| 2018/0174020 A1* | 6/2018 | Wu ......................... | G06N 3/006 |
| 2019/0171660 A1* | 6/2019 | Kershaw ............... | G06F 16/353 |

* cited by examiner

*Primary Examiner* — Ali Bayat
(74) *Attorney, Agent, or Firm* — Fish & Richardson P.C.

(57) ABSTRACT

Disclosed are an apparatus and method for detecting a debatable document. According to an embodiment of the present disclosure, the method for detecting a debatable document includes the steps of receiving a document including one or more sentences; generating an embedding vector for each of words included in the document; and extracting features of the document from an embedding vector matrix including the embedding vectors for the words, and detecting debatability of the document from the extracted features through a detection model including a two-step convolutional neural network.

14 Claims, 5 Drawing Sheets

APPARATUS AND METHOD FOR DETECTING DEBATABLE DOCUMENT

CROSS-REFERENCE TO RELATED APPLICATION

This application claims priority to and the benefit of Korean Patent Application No. 10-2016-0182612, filed on Dec. 29, 2016, the disclosure of which is incorporated herein by reference in its entirety.

BACKGROUND

1. Field

Embodiments of the present disclosure are directed to a deep learning technology using a convolutional neural network.

2. Discussion of Related Art

A debate refers to a process of reaching a proper compromise through a discussion about a certain subject by exchanging individual opinions. In particular, a debate over a social network service (SNS) has advantages in that anyone can freely offer their opinion, pros and cons are directly presented, and it is possible to discuss various issues that are not covered by existing media. On the other hand, such freedom may cause social trouble since a comment posted on a SNS may distort facts or be a malicious revelation or slander. A debate-provoking comment is believed to have a great social ripple effect regardless of whether it is positive or negative.

Recently, research on classifying documents generated in an SNS from various points of view has been conducted. Research on sorting emotions of tweets in Twitter is a representative example thereof. In this research, a formal vocabulary was extracted from tweets, and emotions were sorted through a lexicon-based sorter. By extension, research on extracting features by using not only a formal vocabulary but also an informal vocabulary in tweets was conducted, and emotions of a document were sorted through a support vector machine (SVM). From a point of view of grasping tastes of a user who uses a Chinese SNS blog, research on approaching an SNS classification problem is in progress. Further, a system for monitoring cyberbullying on the basis of data collected from various SNSs such as Twitter, Myspace, Slashdot, and the like by applying an ensemble model thereto has been proposed.

SUMMARY

Embodiments of the present disclosure provide an apparatus and method for detecting debatability of a document through deep learning using a convolutional neural network.

According to an aspect of the present disclosure, there is provided a method for detecting a debatable document performed in a computing device including one or more processors and a memory storing one or more programs to be executed by the one or more processors, the method including: receiving a document including one or more sentences; generating an embedding vector for each of words included in the document; and extracting features of the document from an embedding vector matrix including the embedding vectors for the words, and detecting debatability of the document from the extracted features through a detection model including a two-step convolutional neural network.

The detection model may include a first-step convolutional neural network including a first convolution layer for outputting a first feature vector by performing a convolution operation between the embedding vector matrix and a plurality of filters, and a first pooling layer for outputting a second feature vector by performing sub-sampling to the first feature vector; and a second-step convolutional neural network including a second convolution layer for outputting a third feature vector by performing a convolution operation between the second feature vector and a plurality of filters, and a second pooling layer for outputting a fourth feature vector by performing sub-sampling to the third feature vector.

The first convolution layer and the second convolution layer may perform the convolution operation using a hyperbolic tangent function or a rectified linear unit (ReLU) function as an activation function.

The first pooling layer and the second pooling layer may perform the sub-sampling using a max pooling function.

The detection model may further include one or more fully-connected layers connected to the second pooling layer; and an output layer for outputting a discrimination value of the debatability of the document from outputs of the one or more fully-connected layers.

The output layer may output the discrimination value using a softmax function as an activation function.

The generating of the embedding vector may include converting each of the words included in the document into a one-hot vector, and generating the embedding vector for each of the words by a product of the embedding matrix and the one-hot vector for each of the words.

According to an embodiment of the present disclosure, there is provided an apparatus for detecting a debatable document, the apparatus including: an inputter configured to receive a document including one or more sentences; an embedding vector generator configured to generate an embedding vector for each of words included in the document; and a determiner configured to extract features of the document from an embedding vector matrix including the embedding vectors for the words, and detect debatability of the document from the extracted features through a detection model including a two-step convolutional neural network.

The detection model may include a first-step convolutional neural network including a first convolution layer for outputting a first feature vector by performing a convolution operation between the embedding vector matrix and a plurality of filters, and a first pooling layer for outputting a second feature vector by performing sub-sampling to the first feature vector; and a second-step convolutional neural network including a second convolution layer for outputting a third feature vector by performing a convolution operation between the second feature vector and a plurality of filters, and a second pooling layer for outputting a fourth feature vector by performing sub-sampling to the third feature vector.

The first convolution layer and the second convolution layer may perform the convolution operation using a hyperbolic tangent function or an ReLU function as an activation function.

The first pooling layer and the second pooling layer may perform the sub-sampling using a max pooling function.

The detection model may further include one or more fully-connected layers connected to the second pooling layer; and an output layer for outputting a discrimination value of the debatability of the document from outputs of the one or more fully-connected layers.

The output layer may output the discrimination value using a softmax function as an activation function to output the discrimination value.

The embedding vector generator may be configured to convert each of the words included in the document into a one-hot vector and generate the embedding vector for each of the words by a product of the embedding matrix and the one-hot vector for each of the words.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Embodiments of the present disclosure will be described below with reference to accompanying drawings. The detailed descriptions set forth herein are provided for a better comprehensive understanding of a method, apparatus, and/or system described in this specification. However, these descriptions are nothing but examples and are not to be construed as limiting the present disclosure.

In descriptions of the embodiments of the present disclosure, detailed descriptions about a publicly known art related to the present disclosure will be omitted when it is determined that the detailed descriptions obscure the gist of the present disclosure. Further, terms used herein, which are defined by taking the functions of the present disclosure into account, may vary depending on users, an intention or convention of an operator, and the like. Therefore, the definition should be based on the content given throughout the specification. The terms in the detailed descriptions are used only for describing the embodiments of the present disclosure and are not restrictively used. Unless otherwise indicated, terms having a singular form also have a plural meaning. In the present disclosure, expressions such as "include" or "have" indicate the inclusion of certain features, numerals, steps, operations, elements, or a combination thereof, and are not to be construed as excluding the presence or possibility of one or more other certain features, numerals, steps, operations, elements, or a combination thereof.

Figure 1:
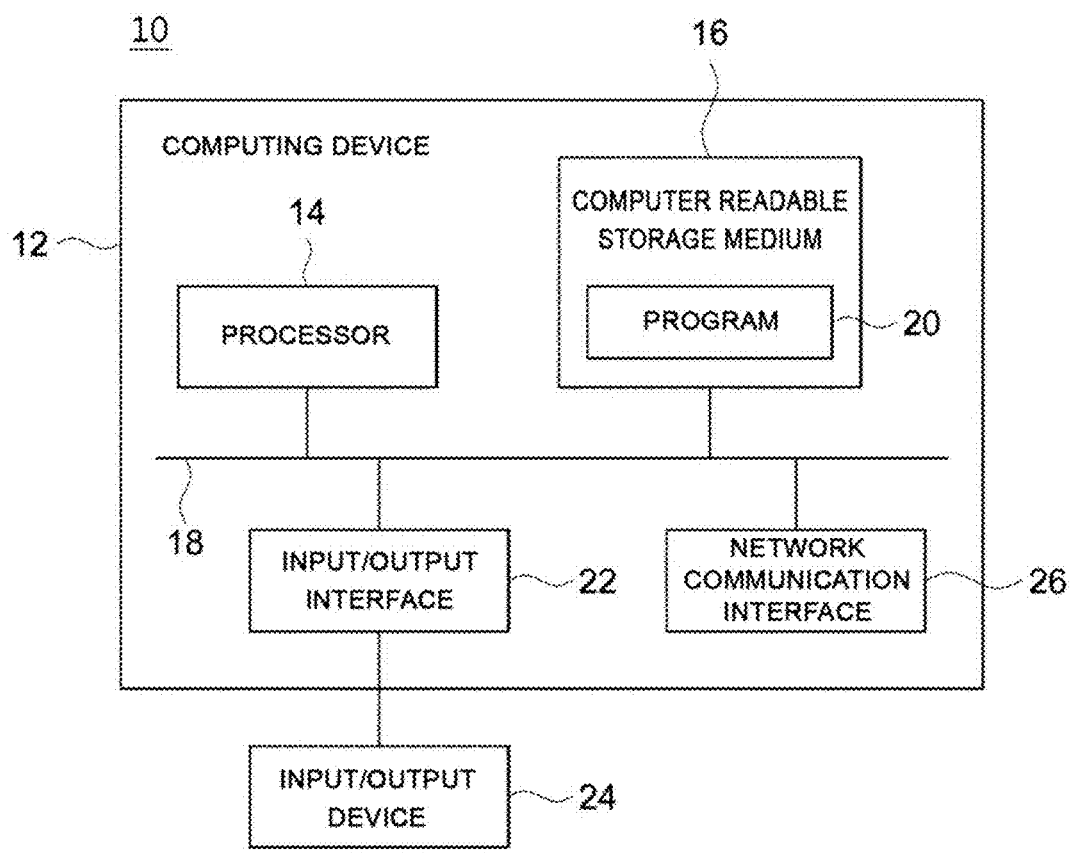
FIG. 1 is a block diagram for exemplifying and describing a computing environment including a computing device suitable for use in the exemplified embodiments.

FIG. 1 is a block diagram for exemplifying and describing a computing environment 10 including a computing device suitable for use in the exemplified embodiments. In the illustrated embodiments, components may have functions and abilities different from those of the following descriptions, and there may be another component in addition to those described in the following.

The computing environment 10 shown in FIG. 1 includes a computing device 12. According to an embodiment, the computing device 12 may be a debatable document detecting apparatus according to the embodiments of the present disclosure. The computing device 12 includes at least one processor 14, a computer readable storage medium 16, and a communication bus 18. The processor 14 may make the computing device 12 operate according to the above-mentioned exemplified embodiments. For example, the processor 14 may execute one or more programs stored in the computer readable storage medium 16. The one or more programs may include one or more computer executable instructions, and the computer executable instruction may be configured to make the computing device 12 operate according to the exemplified embodiments when executed by the processor 14.

The computer readable storage medium 16 is configured to store a computer executable instruction or program code, program data, and/or information having other suitable forms. A program 20 stored in the computer readable storage medium 16 includes an instruction set executable by the processor 14. According to an embodiment, the computer readable storage medium 16 may include a memory (i.e. a volatile memory such as a random access memory (RAM), a nonvolatile memory, or a proper combination thereof), one or more of magnetic disk storage devices, optical disk storage devices, flash memory devices, other storage media accessed by the computing device 12 and capable of storing desired information, or a proper combination thereof.

The communication bus 18 connects various components of the computing device 12, such as the processor 14 and the computer readable storage medium 16, with each other.

The computing device 12 may also include one or more input/output interfaces 22 providing interfaces for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. An exemplary input/output device 24 may include an input device such as a pointing device (e.g. a mouse, a trackpad, and the like), a keyboard, a touch input device (e.g. a touch pad, a touch screen, and the like), a voice or sound input device, various kinds of sensing devices, and/or a photographing device, and/or an output device such as a display device, a printer, a loudspeaker, and/or a network card. The exemplified input/output device 24 may be internally provided in the computing device 12 as a component of the computing device 12, or may be provided separately from the computing device 12 and connected to the computing device 12.

Embodiments of the present disclosure are directed to a method of receiving an input document with one or more sentences and analyzing the input document to determine whether the document is debatable.

According to the embodiments of the present disclosure, the document may include a variety of documents, for example, an essay posted on a social network service (SNS), a blog, and the like, an Internet article, and the like to which unspecified individuals can access through the Internet and voice their opinions on the document via comments, sympathetic expressions, unsympathetic expressions, or the like.

Moreover, debatability refers to the probability of content of a document provoking a debate among a plurality of people.

According to an embodiment of the present disclosure, the computing device 12 can receive an input document to be subjected to debatability detection and detect the debatability of the input document using a detection model including a two-step convolutional neural network.

At this time, the detection model may be learned through supervised learning by using training data in which a plurality of previously collected documents and debatability of each of the documents are employed as an input and output pair.

For example, documents posted on an SNS or the Internet and metadata about the documents may be collected to generate the training data. At this time, the metadata may include the number of comments, the number of sympathetic expressions, and the number of unsympathetic expressions for each of the collected documents, the number of sympathetic expressions and the number of unsympathetic expressions for the comments, and the like.

Moreover, the debatability of each of the documents collected for learning the detection model may be determined on the basis of heuristics using the metadata of each of the documents.

For example, when a document among the collected documents has 100 or more unsympathetic expressions, 10 or more comments, and a maximum number of 10 or more unsympathetic expressions for the comments, the document is determined to be a debatable document, and the other documents are determined as non-debatable documents and used for the training data.

Moreover, the metadata used for determining the debatability of each of the documents collected when generating the training data and a criterion for determining the debatability of each of the documents are not necessarily limited to the foregoing example, and may vary depending on embodiments.

Figure 2:
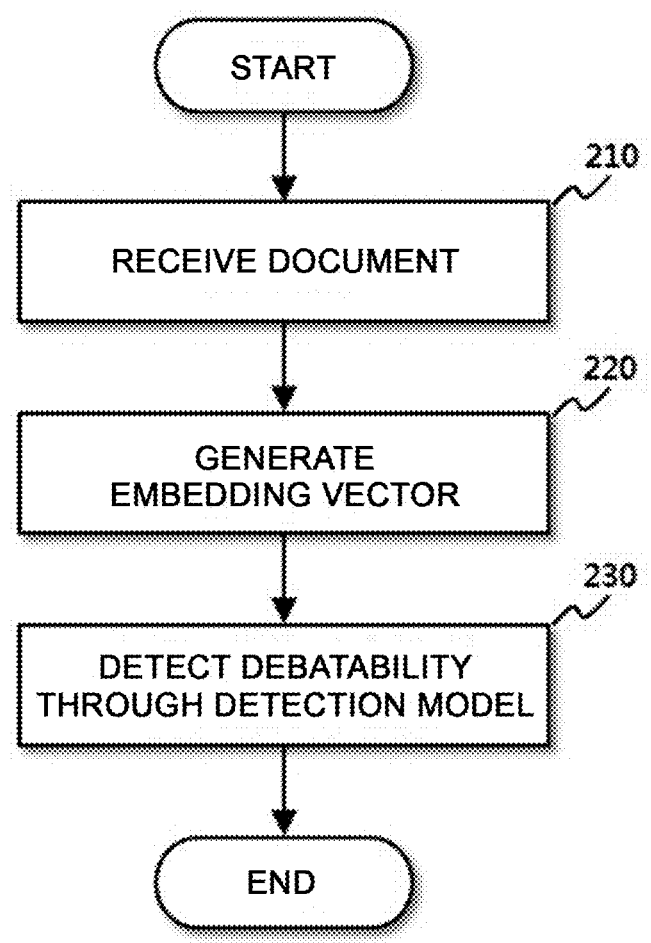
FIG. 2 is a flowchart of a method of detecting debatability according to an embodiment of the present disclosure.

FIG. 2 is a flowchart of a method for determining debatability according to an embodiment of the present disclosure.

For example, the method shown in FIG. 2 may be performed by the computing device 12 that includes one or more processors and a memory for storing one or more programs to be executed by the one or more processors.

Moreover, the flowchart shown in FIG. 2 shows the method as being divided into a plurality of operations, but at least some of the operations may be reordered, performed in combination with another operation, omitted, divided into sub operations, or performed with one or more added operations (not shown).

Referring to FIG. 2, in an operation 210, the computing device 12 receives an input document to be subjected to debatability detection.

In an operation 220, the computing device 12 generates an embedding vector for each of words included in the input document through word embedding.

Specifically, according to an embodiment of the present disclosure, the computing device 12 converts each of the words included in the input document into a vector in a preset dimension and generates the embedding vector for each of the words by a product of each of the converted vectors and an embedding matrix having a preset dimension.

Figure 3:
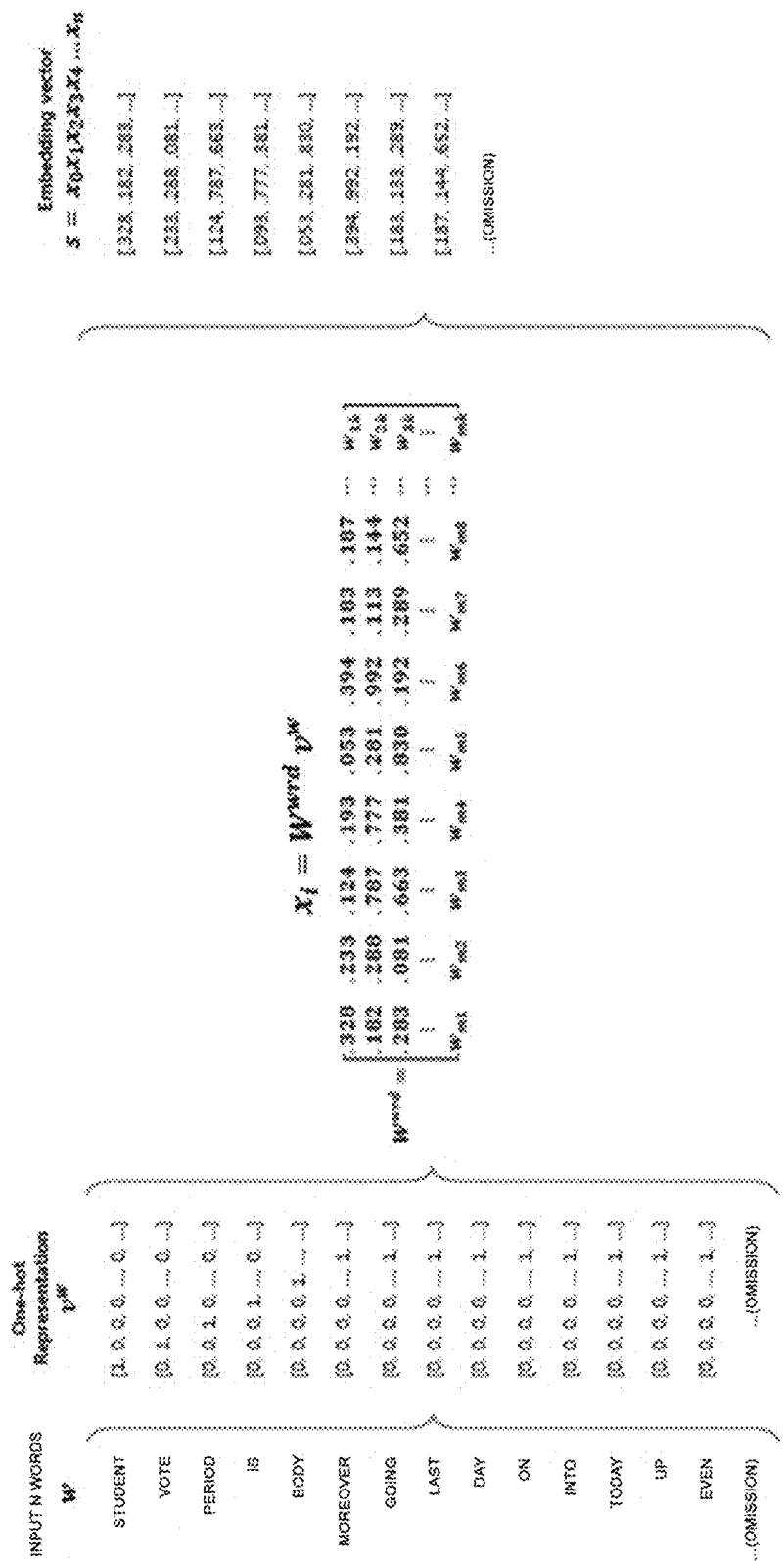
FIG. 3 illustrates an example for describing a process of generating an embedding vector according to an embodiment of the present disclosure.

FIG. 3 illustrates an example for describing a process of generating an embedding vector according to an embodiment of the present disclosure.

Referring to FIG. 3, first, the computing device 12 generates an m-dimensional one-hot vector $v^w$ for each word w included in an input document. At this time, the one-hot vector refers to a vector in which only a value of a dimension assigned to a specific word is 1 and values of the other dimensions are 0 when one of m dimensions is assigned to each of the words and it is assumed that the total number of words included in documents used in learning is m.

Moreover, according to an embodiment of the present disclosure, in order to avoid ambiguity in each of the words w, a preprocess of adding a morpheme to each of the words w may be performed before generating the one-hot vector $v^w$ from each of the words w included in the document.

Moreover, when n words w are included in the input document, n one-hot vectors $v^w$ having a dimension of 1×m corresponding to each of the words w are generated.

Moreover, after generating the one-hot vector $v^w$ for each of the words w, the computing device 12 may generate an embedding vector $x_i$ for each of the words w by a product of the generated one-hot vector $v^w$ and an embedding matrix $W^{wrd}$ having a dimension of m×k.

At this time, the embedding matrix $W^{wrd}$ may be for example learned through unsupervised learning using a back propagation algorithm from the documents collected for the learning.

Moreover, when the n words w are included in the input document and the embedding vector $x_i$ for each of the words w is generated using the embedding matrix having the dimension of m×k, as described above, the input document may be represented with an embedding vector matrix s having a dimension of n×k by connecting the n embedding vectors $x_i$ together, as shown in the following expression 1.

$$s = x_0 x_1 x_2 \ldots x_n \qquad \text{[Expression 1]}$$

Referring back to FIG. 2, in the operation 220, the computing device 12 determines the debatability of the input document using a detection model including a two-step convolutional neural network.

Figure 4:
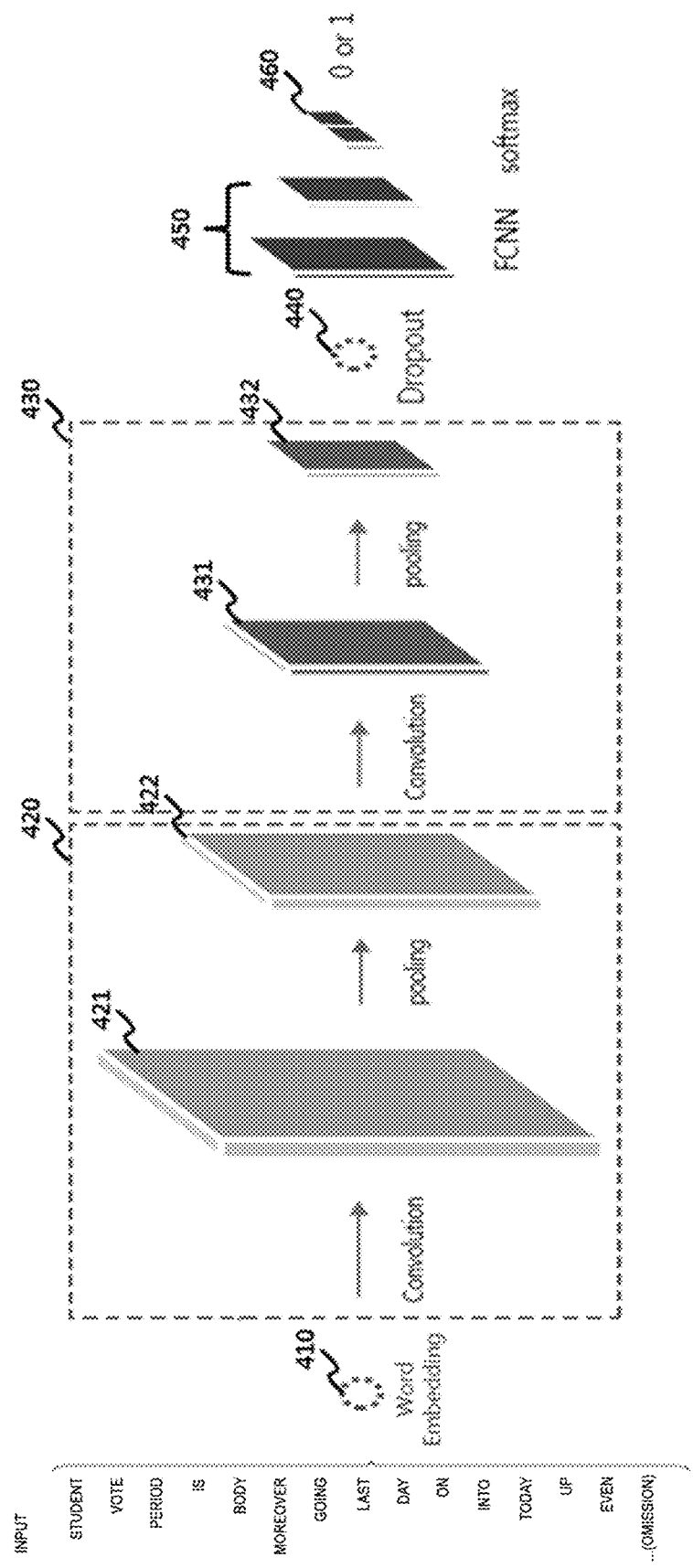
FIG. 4 is a diagram of a detection model according to an embodiment of the present disclosure.

Specifically, FIG. 4 is a diagram of a detection model according to an embodiment of the present disclosure.

Referring to FIG. 4, according to an embodiment of the present disclosure, the detection model may include a first-step convolutional neural network 420, a second-step convolutional neural network 430, one or more fully-connected neural network layers 450, and an output layer 460.

The first-step convolutional neural network 420 may include a first convolution layer 421 and a first pooling layer 422.

Specifically, the first convolution layer 421 receives the embedding vector matrix s generated through the word embedding 410 performed in the operation 210 and outputs a first feature vector through a convolution operation between the embedding vector matrix s and a plurality of filters.

Specifically, when a vector is a vector obtained by connecting embedding vectors together with regard to words from an $i^{th}$ word to a $j^{th}$ word of the input document, the convolution operation for a matrix $x_{i:i+h-1}$ including h adjacent words is performed in the first convolution layer 421.

For example, a combination X of matrices that can be made with embedding vectors for three adjacent words in a document including n words is represented by the following expression 2.

$$X = \{x_{1:3}, x_{2:4}, x_{3:5}, x_{4:6}, \ldots, x_{n-2:n}\} \qquad \text{[Expression 2]}$$

Further, the convolution operation for each of elements of the combination X may be performed through the following expression 3.

$$c_i = f(w \cdot x_{i:i+h-1} + b) \qquad \text{[Expression 3]}$$

In the expression 3, $f$ indicates an activation function of the first convolution layer 421, and, for example, may use a nonlinear function such as a hyperbolic tangent (tan h) function, a rectified linear unit (ReLU), and the like.

Further, in the expression 3, w indicates a weight matrix and b indicates a bias which can be learned through a back propagation algorithm using a gradient descent method, for example, an Adadelta method, an Adagrad method, an RMSProp method, an Adam method, and the like.

Moreover, a first feature vector $c=[c_1, c_2, c_3, c_4, \ldots, c_{n-2}]$ can be obtained by the convolution operation performed in the first convolution layer 421.

The first pooling layer 422 extracts major feature vectors by applying sub-sampling to the first feature vector c output from the first convolution layer 421.

At this time, according to an embodiment of the present disclosure, the first pooling layer 422 may use max pooling function or average pooling function to extract major features from the first feature vector c.

For example, when the first pooling layer 422 has a pooling length of 3 and a stride of 3 under the assumption that the max pooling function is used in the first pooling layer 422, a second feature vector c' output from the first feature vector c input to the first pooling layer 422 is equal to $c'[\max(c_{1:3}), \max(c_{2:4}), \max(c_{n-4:n-2})]$.

Moreover, the second-step convolutional neural network 430 may include a second convolution layer 431 and a second pooling layer 432.

Specifically, the second convolution layer 431 may receive the second feature vector c' output from the first pooling layer 422 and output a third feature vector through a convolution operation. At this time, the convolution operation performed in the second convolution layer 431 may be carried out in the same manner as the convolution operation performed in the first convolution layer 421.

The second pooling layer 432 may output a fourth feature vector by applying sub-sampling to the third feature vector output from the second convolution layer 431. At this time, the sub-sampling performed in the second pooling layer 432 may be carried out in the same manner as that of the first pooling layer 431.

Moreover, the fourth feature vector output from the second pooling layer 432 is input to one or more fully-connected layers 450.

At this time, according to an embodiment of the present disclosure, a dropout 440 may be applied after the second pooling layer 432 to avoid an overfitting phenomenon.

Moreover, the output layer 460 is located behind the one or more fully-connected layers 450 so that the output layer 460 can output a discrimination value indicating the debatability of the document from a vector output from the last fully-connected layer.

At this time, according to an embodiment of the present disclosure, a softmax function may be used as the activation function for the output layer 460.

Figure 5:
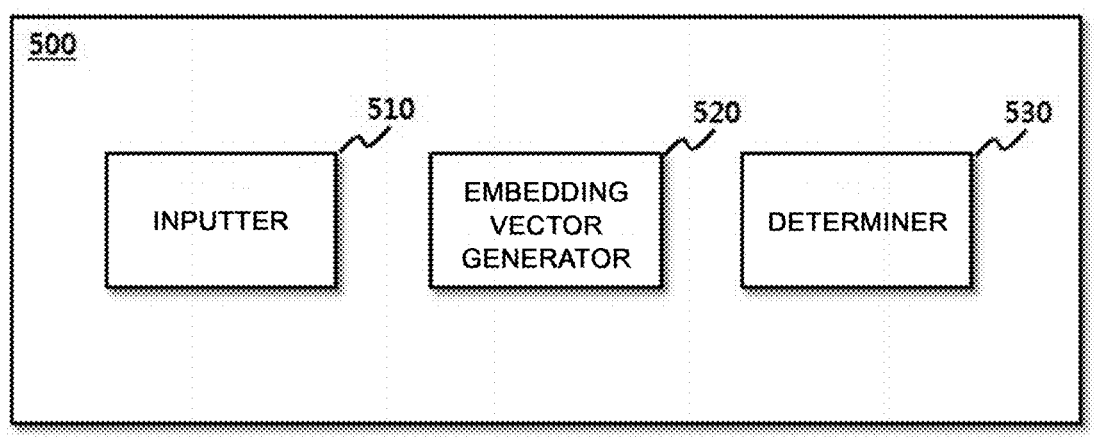
FIG. 5 is a diagram of a debatable document detecting apparatus (500) according to an embodiment of the present disclosure.

FIG. 5 is a diagram of a debatable document detecting apparatus 500 according to an embodiment of the present disclosure.

Referring to FIG. 5, according to an embodiment of the present disclosure, the debatable document detecting apparatus 500 includes an inputter 510, an embedding vector generator 520, and a determiner 530.

The inputter 510 receives an input document to be subjected to debatability detection.

The embedding vector generator 520 generates an embedding vector for each of words included in the input document.

Specifically, according to an embodiment of the present disclosure, the embedding vector generator 520 may generate a one-hot vector for each of the words included in the input document, and then generate the embedding vector by a product the one-hot vector and an embedding matrix.

The determiner 530 may output a discrimination value of the debatability of the input document from the embedding vector matrix generated by the embedding vector generator 520 through a detection model including a two-step convolutional neural network.

Specifically, the detection model may have a structure identical to that shown in FIG. 4, and the determiner 530 may use the detection model to output the discrimination value of the debatability of the input document through a method identical to the foregoing method.

Moreover, according to an embodiment, the debatable document detecting apparatus 500 may be implemented in a computing device that includes at least on processor and a computer readable recording medium connected to the processor. The computer readable recording medium may be internally or externally provided in the processor and connected to the processor by various well-known means. The processor in the computing device may make each computing device operate according to exemplified embodiments described in this specification. For example, the processor may execute an instruction stored in the computer readable recording medium, and the instruction stored in the computer readable recording medium may be configured to make the computing device operate according to the exemplified embodiments described in this specification when executed by the processor.

Moreover, an embodiment of the present disclosure may include a computer readable recording medium with a program for implementing the methods described in this specification on a computer. The computer readable recording medium may include one or a combination of a program command, a local data file, a local data structure, and the like. The medium may be specially designed and configured for the present disclosure, or may be typically available in the computer software field. For example, the computer readable recording medium may include a magnetic medium such as a hard disk, a floppy disc, and a magnetic tape; an optical recording medium such as a compact disc read-only memory (CD-ROM) and a digital versatile disc (DVD); a magnetic-optical medium such as a floppy disc; and a hardware device specially configured to store and execute a program command, such as a ROM, a RAM, a flash memory, and the like. For example, the program command may include not only a machine language code produced by a compiler, but also a high-level language code to be executable by a computer through an interpreter or the like.

According to the embodiments of the present disclosure, since debatability of a document is detected using a two-step convolutional neural network, accuracy of the detection of the debatability is improved even when the document includes a plurality of sentences.

Although exemplary embodiments of the present disclosure have been described in detail, it should be appreciated by a person having ordinary skill in the art that various changes may be made to the foregoing exemplary embodiments without departing from the scope of the present disclosure, and the scope is not limited to the foregoing embodiments but is defined in the following claims and their equivalents.

What is claimed is:
1. A method for detecting a debatable document performed in a computing device comprising one or more processors and a memory storing one or more programs to be executed by the one or more processors, the method comprising:

receiving a document comprising one or more sentences;

generating an embedding vector for each of words included in the document; and extracting features of the document from an embedding vector matrix comprising the embedding vectors for the words, and detecting debatability of the document from the extracted features through a detection model comprising a first-step convolutional neural network and a second-step convolutional neural network, wherein each of the first-step convolutional neural network and the second-step convolutional neural network comprises a convolution layer.

2. The method of claim 1, wherein the detection model comprises the first-step convolutional neural network comprising a first convolution layer for outputting a first feature vector by performing a convolution operation between the embedding vector matrix and a plurality of filters, and a first pooling layer for outputting a second feature vector by performing sub-sampling to the first feature vector; and the second-step convolutional neural network comprising a second convolution layer for outputting a third feature vector by performing a convolution operation between the second feature vector and a plurality of filters, and a second pooling layer for outputting a fourth feature vector by performing sub-sampling to the third feature vector.

3. The method of claim 2, wherein the first convolution layer and the second convolution layer perform the convolution operation using a hyperbolic tangent function or a rectified linear unit (ReLU) function as an activation function.

4. The method of claim 2, wherein the first pooling layer and the second pooling layer perform the sub-sampling using a max pooling function.

5. The method of claim 2, wherein the detection model further comprises:

one or more fully-connected layers connected to the second pooling layer; and an output layer for outputting a discrimination value of the debatability of the document from outputs of the one or more fully-connected layers.

6. The method of claim 5, wherein the output layer outputs the discrimination value using a softmax function as an activation function.

7. The method of claim 1, wherein the generating of the embedding vector comprises converting each of the words included in the document into a one-hot vector, and generating the embedding vector for each of the words by a product of the embedding matrix and the one-hot vector for each of the words.

8. An apparatus for detecting debatable document, the apparatus comprising:

one or more hardware processors and one or more computer readable media storing instructions that, when executed by the one or more hardware processors, cause the apparatus to:

receive a document comprising one or more sentences;

generate an embedding vector for each of words included in the document; and extract features of the document from an embedding vector matrix comprising the embedding vectors for the words, and detect debatability of the document from the extracted features through a detection model comprising a first-step convolutional neural network and a second-step convolutional neural network, wherein each of the first-step convolutional neural network and the second-step convolutional neural network comprises a convolution layer.

9. The apparatus of claim 8, wherein the detection model comprises:

the first-step convolutional neural network comprising a first convolution layer for outputting a first feature vector by performing a convolution operation between the embedding vector matrix and a plurality of filters, and a first pooling layer for outputting a second feature vector by performing sub-sampling to the first feature vector; and the second-step convolutional neural network comprising a second convolution layer for outputting a third feature vector by performing a convolution operation between the second feature vector and a plurality of filters, and a second pooling layer for outputting a fourth feature vector by performing sub-sampling to the third feature vector.

10. The apparatus of claim 9, wherein the first convolution layer and the second convolution layer perform the convolution operation using a hyperbolic tangent function or a rectified linear unit (ReLU) function as an activation function.

11. The apparatus of claim 9, wherein the first pooling layer and the second pooling layer perform the sub-sampling using a max pooling function.

12. The apparatus of claim 9, wherein the detection model further comprises one or more fully-connected layers connected to the second pooling layer; and an output layer for outputting a discrimination value of the debatability of the document from outputs of the one or more fully-connected layers.

13. The apparatus of claim 12, wherein the output layer outputs the discrimination value using a softmax function as an activation function.

14. The apparatus of claim 8, wherein the one or more computer readable media further include instructions that when executed cause the apparatus to convert each of the words included in the document into a one-hot vector and generate the embedding vector for each of the words by a product of the embedding matrix and the one-hot vector for each of the words.

* * * * *